July 6, 1971   F. W. HARTSTEIN   3,591,434
BI-AXIAL LAMINATED NON-WOVEN FABRIC AND METHOD OF MANUFACTURE
Filed Aug. 21, 1967   4 Sheets-Sheet 1
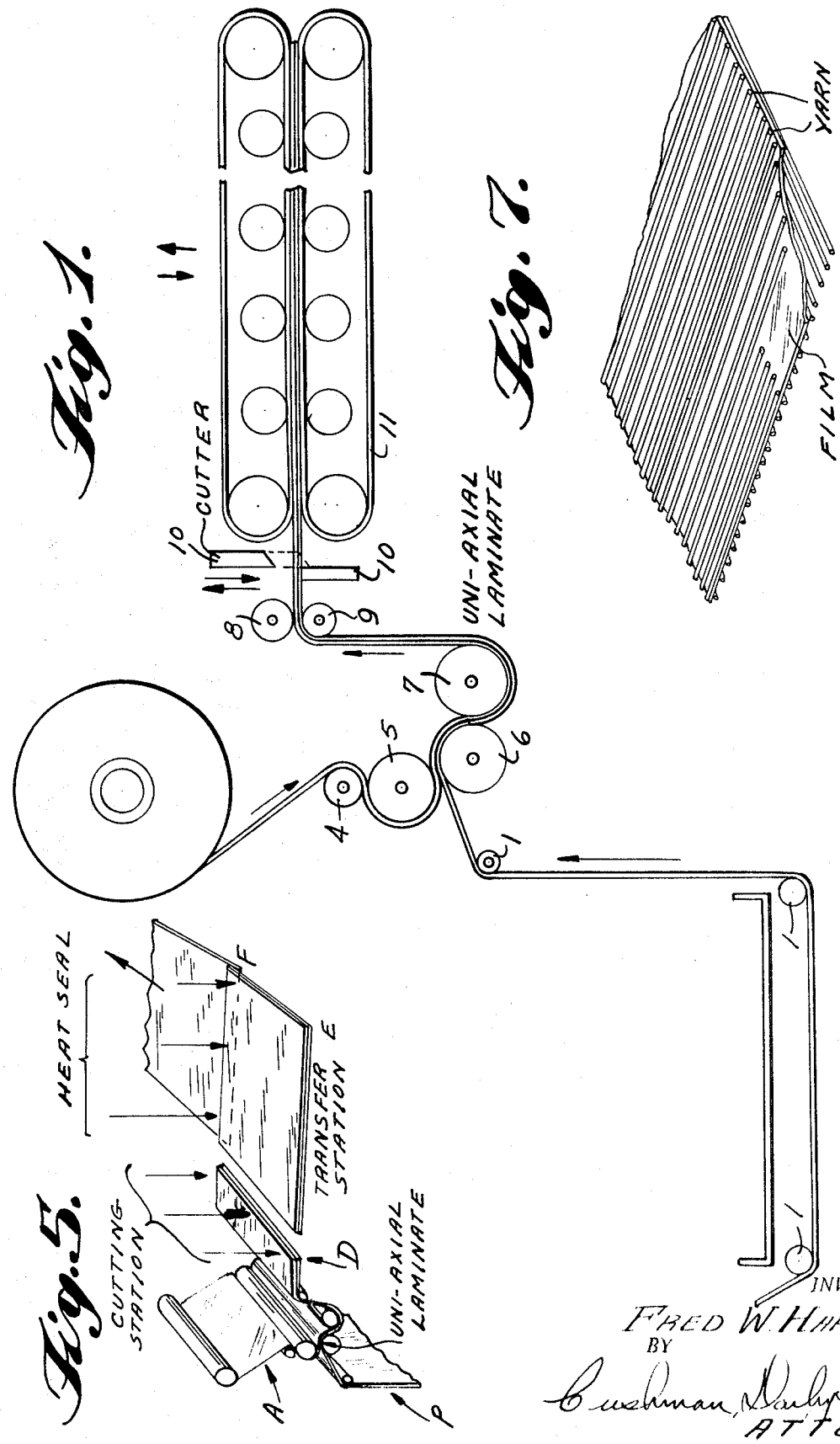
INVENTOR.
FRED W. HARTSTEIN
BY
Cushman, Darby & Cushman
ATTORNEYS

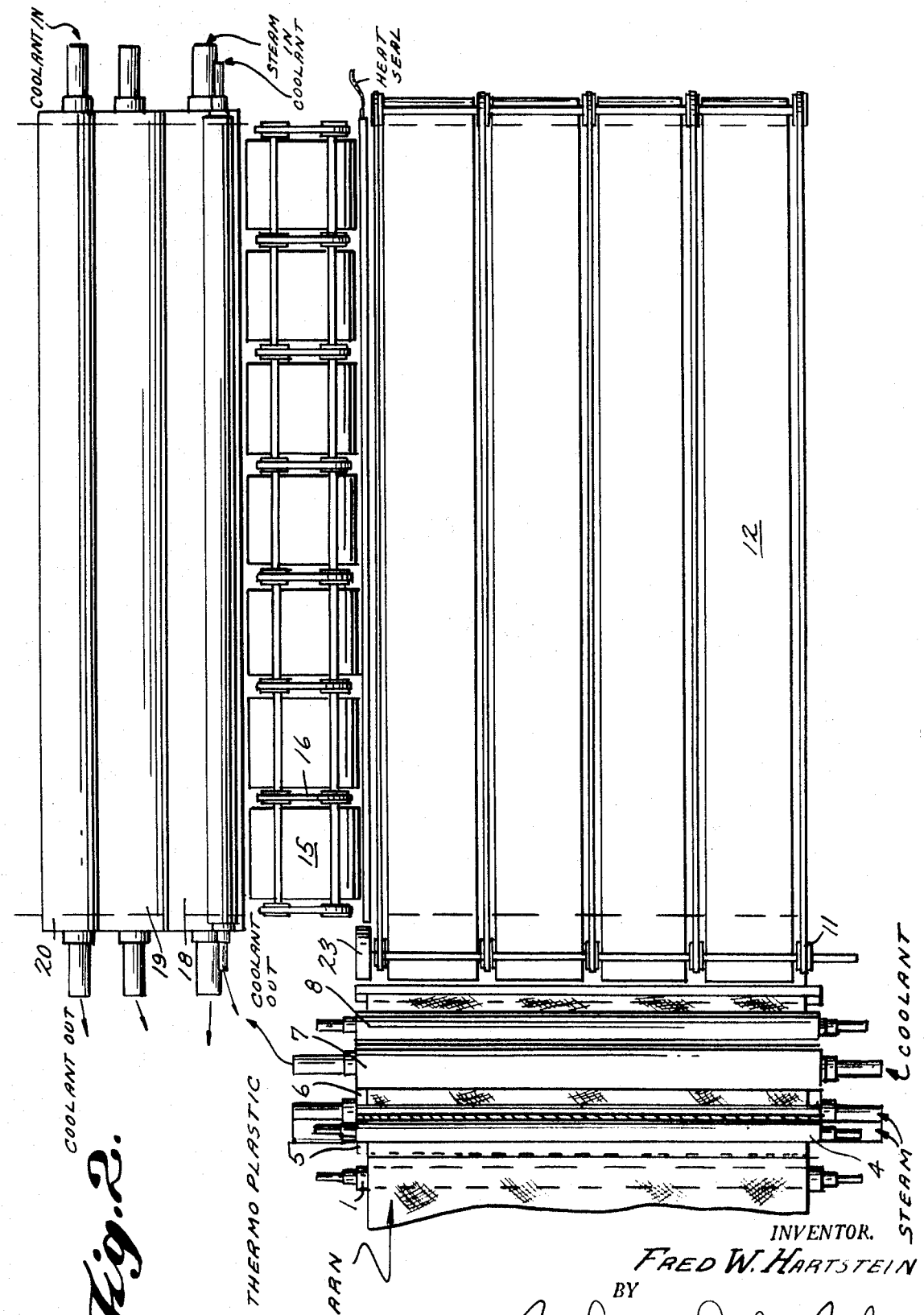

July 6, 1971   F. W. HARTSTEIN   3,591,434
BI-AXIAL LAMINATED NON-WOVEN FABRIC AND METHOD OF MANUFACTURE
Filed Aug. 21, 1967   4 Sheets-Sheet 3

INVENTOR.
FRED W. HARTSTEIN
BY
Cushman, Darby & Cushman
ATTORNEYS

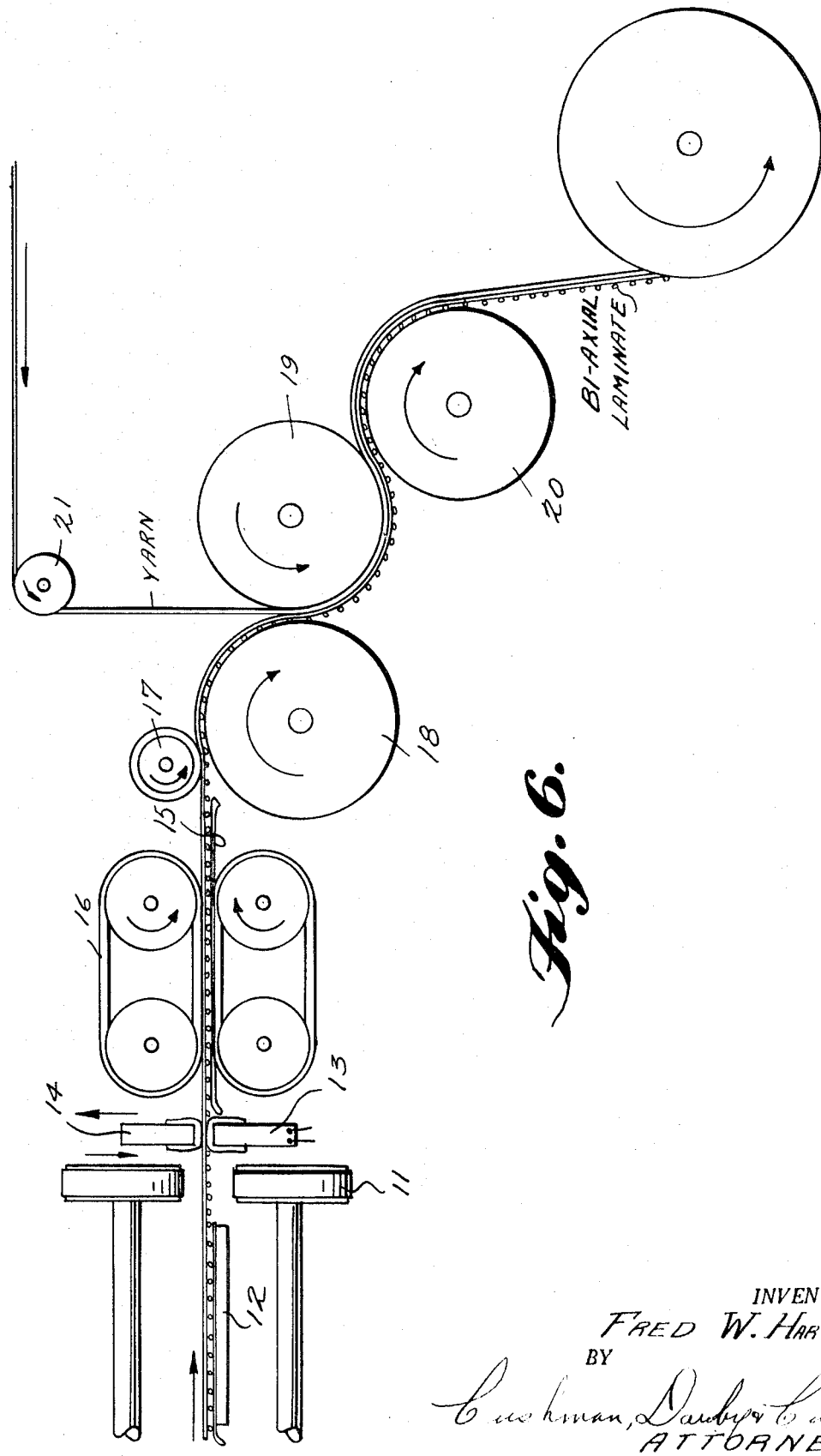

United States Patent Office 3,591,434
Patented July 6, 1971

3,591,434
BI-AXIAL LAMINATED NON-WOVEN FABRIC
AND METHOD OF MANUFACTURE
Fred W. Hartstein, Afton, Va., assignor to
Swirltex, Inc., Afton, Va.
Filed Aug. 21, 1967, Ser. No. 662,070
Int. Cl. B32b 5/12
U.S. Cl. 156—178
1 Claim

ABSTRACT OF THE DISCLOSURE

A plurality of yarns are laid parallel to one another and conveyed through a group of heated pressure rollers, where the yarns are bonded to a self-supporting thermoplastic film, such as ethylene acrylic acid copolymer, in order to form a uni-axial laminate. The laminate is passed around a chilled roll to stiffen it for additional processing. A predetermined length of laminate is cut and joined along one edge to the corresponding edge of a second uni-axial laminate of similar dimensions by a pair of heat sealing bars. The joined laminate is conveyed by endless belts to a second group of heated pressure rollers where a second group of parallel yarns is cross-laid and bonded to the opposite side of the uni-axial laminate, thus forming a bi-axial laminated non-woven fabric, which is chilled by passing over a chilled roll and is wound on a spool. The yarn employed may be relatively stiff, such as paper. Or, it may be made relatively flexible, by using natural or synthetic fibers such as cotton or rayon. Also, a layer of paper yarn may be laid on one side of the film, and a layer of flexible fibers on the opposite surface. The foregoing abstract is not intended to define the scope of the invention and is only provided to permit a cursory review of the gist of the invention.

BRIEF DESCRIPTION OF INVENTION

This invention relates to a bi-axial laminated non-woven fabric and a method of manufacturing the fabric.

The fabric consists of a plurality or set of parallel yarns which are bonded to one side of a self-supporting, discrete thermoplastic film in order to form a uni-axial laminate, and a second set of parallel yarns that are cross-laid to the aforementioned group of yarns and are bonded to the opposite side of the film, thus forming a bi-axial laminated non-woven fabric which possesses considerable strength in two right-angle directions.

The yarns employed may be relatively stiff or rigid, such as paper, or may be relatively flexible, such as rayon or other synthetic fibers. Or, cotton and similar natural fibers may be used. Also, the fabric may be formed by bonding a layer of relatively rigid yarns to a layer of relatively flexible yarns, thus resulting in a material which possesses a significant degree of flexiblility as well as being relatively rigid.

The fabric which results from the above combinations is extremely versatile and is capable of being employed in many ways. For example, it may be used as a reinforcing material, as window blinds, as a backing material for rugs, as seat cover material. In addition, it may be utilized as a table placemat or as decorative wallpaper.

Briefly, the fabric is produced by the following method. A first plurality of parallel yarns are bonded to a self-supporting, discrete thermoplastic film by advancing them through a plurality of heated pressure rollers, thus forming a first uni-axial laminate. The laminate is cooled by contact with a chilled roller, after which a predetermined length of laminate is severed by a pair of cooperating cutters. The severed laminate is aligned adjacent to a second uni-axial laminate and the overlapping edges of the laminates are joined by heat-sealing. The joined laminate is then bonded to a second plurality of parallel yarns which are cross-laid with respect to the first set of yarns on the opposite side of the film, thereby forming a bi-axial laminated non-woven fabric which possesses considerable strength in two right-angle directions. The bonding is effected by means of heated pressure rollers, and the fabric is then chilled or cooled by contact with a chilled roller, after which it is wound on a spool.

In addition to the salient features mentioned above, other advantages of this invention will become apparent in the more detailed discussion which follows.

In the more detailed discussion of the invention reference will be made to the accompanying drawings in which:

FIG. 1 is a schematic side view of the apparatus employed in conveying the yarn and thermoplastic film to form and sever a predetermined length of the uni-axial laminate;

FIG. 2 is a top plan view of the apparatus shown in FIG. 1;

Figure 4:
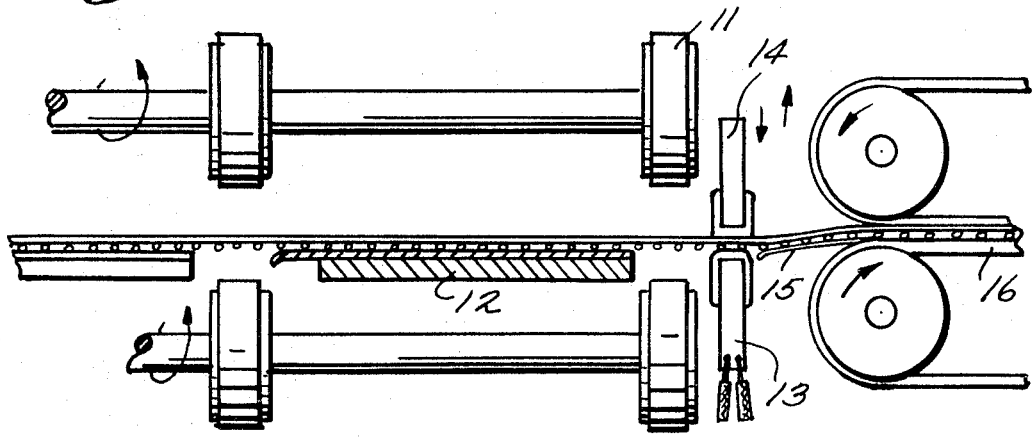
Figure 3:
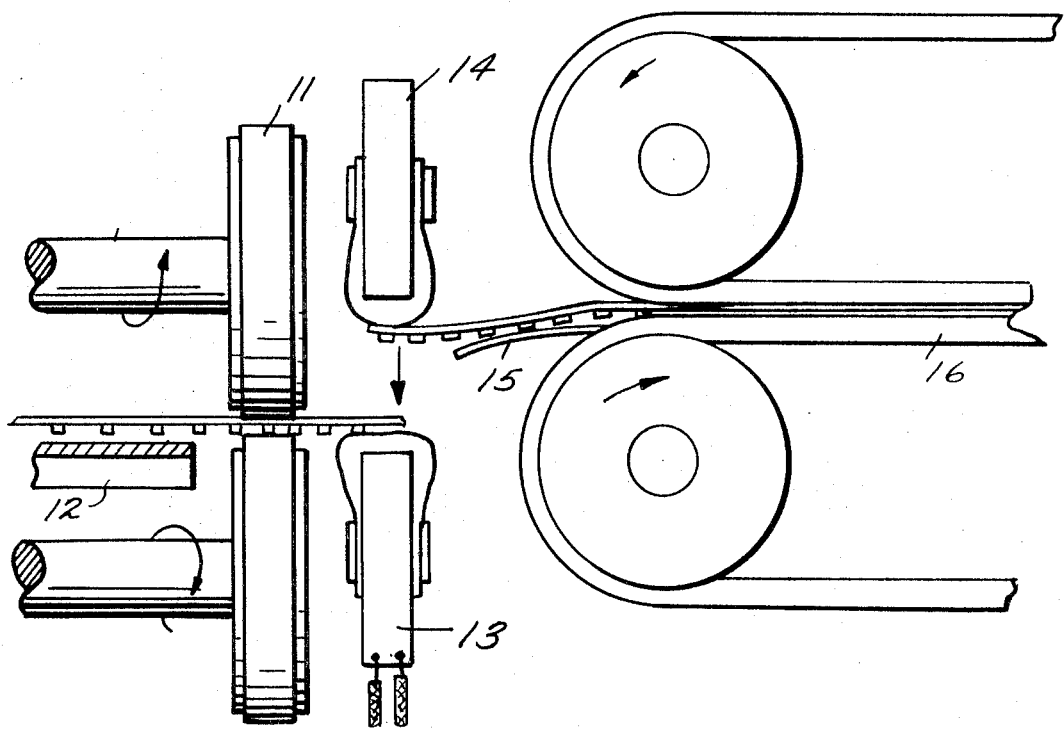

FIG. 3 provides an end view of the heat sealing bars prior to joining the edges of the uni-axial laminates;

FIG. 4 is a view of the apparatus shown in FIG. 3 as the laminates are in the process of being joined to one another;

FIG. 5 is a schematic representation of the initial steps of the process, including severing and joining the uni-axial laminates.

FIG. 6 is a diagrammatic side view of the apparatus employed in forming the bi-axial laminate fabric; and FIG. 7 is a cutaway view of one embodiment of the fabric.

DETAILED DESCRIPTION OF THE INVENTION

Referring to the drawings, the fabric is produced by the following process:

A self-supporting, discrete thermoplastic film, which may be ethylene acrylic acid copolymer film (for example, Dow Chemical P.Z. 4,333.9 Experimental Film) of a thickness of one-half to one mil, is unwound from a spool and passed between rolls 4 and 5, where it is joined or bonded to a plurality of parallel yarns that are spaced in accordance with the desired fabric density, as the film is conveyed between rolls 5 and 6. Roller 4 is a chilled, elastomer covered nip or bite roll which is chilled by circulating a fluid coolant through a conduit within the roller. Rollers 5 and 6 are heated, preferably by passing steam through central pipes or conduits in the rollers. The individual yarns or fibers are conveyed under an operator's platform 3 and into the nip of rolls 5 and 6. The yarn is guided by a conventional textile industry comb (not shown) prior to joining the thermoplastic film. Roller 5 and 6 are Teflon coated and are maintained at a temperature sufficient to cause the thermoplastic film to become tacky enough so that the yarn will adhere or bond to it, but at the same time the film will remain structurally intact. Rollers 5 and 6 are preferably maintained at 210° F. At this point, the yarn and film have been bonded in such a manner that a first uni-axial laminate is formed.

The first uni-axial laminate is conveyed between heated roll 6 and a chilled roll 7. Roller 7 is chilled in the same manner as roll 4. The uni-axial laminate is thus chilled or cooled in order to stiffen it for additional or subsequent processing. The laminate next passes between an elastomer covered roll 8 and roll 9 which guides it between a set of cooperating cutoff knives 10, which are in the inoperative portion, and then between a set of endless conveyor belts 11 and over a number of support plates 12.

Referring to FIG. 2 of the drawing, one edge of the uni-axial laminate is drawn by the endless belts over a guide plate 23 and over a conventional thermal impulse heat sealing bar 13 (see FIG. 3). The heat seal bar 13 is coated with Teflon impregnated fibre glass tape to prevent sticking to the thermoplastic film. The temperature of the heat seal bar 13 will depend upon the speed of operation of the apparatus, but must be kept below a melting temperature not in excess of 225° F.

When a predetermined length of the first uni-axial laminate, equal to the desired width of the finished bi-axial laminated fabric, has passed between the cutoff knives 10, the afore-mentioned belts and rollers are simultaneously deactivated. The uni-axial laminate is then severed by the cutoff knives 10, and the endless belts 11 advance the severed section of the uni-axial laminate so that the laminate is precisely aligned along its longitudinal edge with the corresponding adjacent edge of a second section of an essentially similar uni-axial laminate through the respective lengths thereof. The second section has been previously positioned within and is held by a deactivated set of endless belts 16, support blades 15 and the heat seal pressure bar 14. Pressure bar 14 is also covered with Teflon impregnated fibre glass tape and cushioned with a strip of elastomer. At this point, the laminates are positioned as indicated in FIG. 3.

The laminates are then joined or sealed to one another as shown in FIG. 4. The joining is accomplished by pressure between the heat seal bar 13 and heat seal pressure bar 14, bar 13 having been repositioned subadjacent to bar 14. Endless belts 11 then separate, after which cooperating bars 13 and 14 are separated from one another.

FIG. 5 of the drawings depicts in a schematic manner the steps of the process thus far completed. Thus, thermoplastic film A is joined to yarns B in order to form a uni-axial laminate C which is severed at cutting station D and conveyed to transfer station E where it is heat sealed to a previously positioned section of uni-axial laminate at F.

Referring now to FIG. 6 of the drawings, the joined uni-axial laminates are now advanced by endless belts 16 over a number of support plates 15 into the nip formed by an elastomer-covered chilled roll 17 and a heated roller 18. The rollers are heated and cooled in the same manner as described previously.

This advancing movement continues until the trailing edge of the jointed uni-axial laminate is positioned under the heat seal pressure bar 14. At this point endless belts 16 and rollers 17, 18, 19 and 20 are simultaneously deactivated. Note however, that prior to this deactivation, the leading edge of the jointed uni-axial laminate has been advanced over roller 18 and has been joined or bonded at the nip between rollers 18 and 19 to a plurality of parallel yarns which have been unwound from a spool (not shown) and conveyed around guide or idler roll 21. The second plurality or group of parallel yarns is oriented at an angle, preferably of substantially 90°, to that of the first plurality of parallel yarns (which have previously been joined to the thermoplastic film in order to form the uni-axial laminate) and are bonded to the opposite surface of the thermoplastic film. Thus, a bi-axial laminated, non-woven fabric is formed by the conjunction of the jointed uniaxial laminates and the second plurality of parallel yarns. Rollers 18 and 19 are Teflon coated, and are heated to and maintained at a temperature which is sufficient to melt the thermoplastic film in order to eliminate the presence of "windows," that is, film in the interstices of the laminate, in the finished fabric. Roll 18 is maintained at a temperature of approximately 225° F., and roll 19 is maintained at a temperature of about 300° F. The yarn is guided to the nip of the laminating rollers 18 and 19 by idler roll 21 and a conventional textile industry comb (not shown).

The bi-axial laminated fabric is then passed under roll 19 to the nip with chilled roll 20, at which point the lamination is strengthened and finalized under nip pressure. The finished bi-axial laminated fabric is chilled or cooled as it passes over chilled roll 20 and is spooled into a finished bundle. Endless belts 11 then close and the enitre cycle is repeated.

Referring to FIG. 7 of the drawings, one embodiment of the bi-axial laminated, non-woven fabric is disclosed. A layer of thermoplastic film is disposed or sandwiched between two parallel groups or pluralities of a relatively stiff or rigid yarn, such as paper, one of which is cross-laid or oriented at an angle of substantially 90° with respect to the other. If desired, a relatively flexible yarn such as rayon or other synthetic fibers, or natural fibers such as cotton, could be employed. Furthermore, the non-woven fabric could be composed of a layer of thermoplastic film sandwiched between a layer of relatively flexible yarns and a layer or relatively stiff yarns which are cross-laid at right angles to one another.

The resulting fabric possesses substantial versatility; for example, various embodiments may be employed as seat cover material, as window blinds, as backing material for rugs and the like, or as a reinforcing material for textiles in general. In addition, it may be utilized as a table placement or as decorative wall paper.

Although the bi-axial laminated non-woven fabric and the method of making it has been described with reference to particular embodiments, it will become apparent to those skilled in the art that variations can be made in the above disclosure. All such variations as would be obvious to those skilled in the art are intended to be included within the scope of this invention.

What is claimed is:

1. A method of manufacturing a bi-axial laminated non-woven fabric comprising the steps of:

bonding a first plurality of spaced parallel yarns to a surface of a thermoplastic film by the application of heat and pressure, in order to form a first uni-axial laminate, said heat and pressure being applied by a plurality of pressure rollers, at least two of said rollers being heated and maintaind at a temperature sufficient cause and said thermoplastic film to adhere to said yarns while remaining structurally intact, cooling said first uni-axial laminate in order to stiffen it for subsequent processing.

severing a predetermined length of said first uni-axial laminate, aligning said predetermined length of the first uni-axial laminate along one of its edges with a corresponding edge of a second uni-axial laminate, whereby the yarns in said first laminate are maintained in parallel relationship with the yarns in said second laminate, joining said first and second uni-axial laminates by heat sealing the respective corresponding adjacent edges through the respective lengths thereof between a pair of cooperating heat seal pressure bars, bonding said joined uni-axial laminates to a second plurality of spaced parallel yarns, which are cross-laid at an angle of substantially 90° with respect to said first plurality of parallel yarns, on the opposite surface of said thermoplastic film, thus forming a bi-axial laminated non-woven fabric, said fabric possessing considerable strength in two right-angle directions, and
cooling the bi-axial laminated fabric.

References Cited

UNITED STATES PATENTS

| | | | | |
|---|---|---|---|---|
| 2,631,957 | 3/1953 | Francis | | 161—406 |
| 2,725,323 | 11/1955 | Chadwick et al | | 156—181 |
| 2,910,763 | 11/1959 | Lauterbach | | 156—181 |
| 3,041,230 | 6/1962 | Diehl | | 156—178 |
| 3,250,655 | 5/1966 | Adler | | 156—181 |
| 3,444,025 | 5/1969 | Hillas | | 156—178 |

CARL D. QUARFORTH, Primary Examiner

B. H. HUNT, Assistant Examiner

U.S. Cl. X.R.

156—176; 161—406